(12) United States Patent
Davi et al.

(10) Patent No.: US 10,676,289 B2
(45) Date of Patent: Jun. 9, 2020

(54) AUTOMATIC STATION FOR PICKING UP ARTICLES AND RELATED METHOD FOR USING

(71) Applicant: CT PACK S.R.L., Valsamoggia (Bologna) (IT)

(72) Inventors: Daniele Davi, Ferrara (IT); Gabriele Canini, San Giorgio di Piano (IT)

(73) Assignee: CT PACK S.R.L., Valsamoggia (IT)

( * ) Notice: Subject to any disclaimer, the term of this patent is extended or adjusted under 35 U.S.C. 154(b) by 45 days.

(21) Appl. No.: 15/928,654

(22) Filed: Mar. 22, 2018

(65) Prior Publication Data

US 2018/0297794 A1    Oct. 18, 2018

(30) Foreign Application Priority Data

Apr. 13, 2017    (IT) .................. 102017000041616

(51) Int. Cl.
| | |
|---|---|
| G06F 7/00 | (2006.01) |
| B65G 47/90 | (2006.01) |
| B65G 43/08 | (2006.01) |
| B65G 47/91 | (2006.01) |
| B65G 47/42 | (2006.01) |

(52) U.S. Cl.
CPC ........... *B65G 47/905* (2013.01); *B65G 43/08* (2013.01); *B65G 47/42* (2013.01); *B65G 47/907* (2013.01); *B65G 47/918* (2013.01); *B65G 2201/0202* (2013.01); *B65G 2203/0233* (2013.01); *B65G 2203/042* (2013.01)

(58) Field of Classification Search
None
See application file for complete search history.

(56) References Cited

U.S. PATENT DOCUMENTS

| | | | | |
|---|---|---|---|---|
| 2015/0127148 | A1* | 5/2015 | Koyanagi | B25J 9/0084 700/248 |
| 2017/0349385 | A1* | 12/2017 | Moroni | B65G 47/96 |
| 2017/0369244 | A1* | 12/2017 | Battles | B65G 1/137 |

FOREIGN PATENT DOCUMENTS

DE    202004004292 U1    5/2004

OTHER PUBLICATIONS

Italian Search Report dated Jan. 17, 2018 for counterpart Italian Application No. IT 2017000041616.

* cited by examiner

*Primary Examiner* — Yolanda R Cumbess
(74) *Attorney, Agent, or Firm* — Shuttleworth & Ingersoll, PLC; Timothy J. Klima

(57) ABSTRACT

An automatic station for picking up articles which can be used in a machine for packaging articles, which achieves a greater efficiency, relative to the prior art stations, in terms of percentage of the articles picked up.

10 Claims, 10 Drawing Sheets

AUTOMATIC STATION FOR PICKING UP ARTICLES AND RELATED METHOD FOR USING

This application claims priority to Italian Patent Application IT102017000041616 Apr. 13, 2017, the entirety of which is incorporated by reference herein.

BACKGROUND OF THE INVENTION

This invention relates to an automatic station for picking up articles which can be used in a machine for packaging articles, which achieves a greater efficiency, relative to the prior art stations, in terms of percentage of the articles picked up.

SUMMARY OF THE INVENTION

Automatic stations currently exist for picking up articles, which can be used in machines for packaging the articles, which comprise one or more robot units configured for picking up articles moved by means of a movement system. The picking up by the robot units may be aimed, for example, at transferring the articles to another station of the machine or placing them inside one or more boxes.

These articles reach the pick-up station positioned on the movement system in a random manner, so these stations usually have a detection system configured to detect, before the actual picking up by the one or more robot units, the positioning of these articles on the movement system and relative to a reference system integral with it.

The detection system is configured for generating data representing this positioning, and communicating the data to the one or more robot units, so that they pick up as many more articles as possible.

With the increase in the number of articles and the speed of the movement system, there may occur a loss of a certain percentage of the articles entering the pick-up station, thereby causing a reduction in the efficiency of the picking up station in terms of percentage of articles picked up over the total of articles entering the picking up station.

These articles not picked up are then discarded, causing a loss of efficiency of the line which translates into a operating cost.

The aim of this invention is to provide a station for the automatic picking up of articles which allows an improved efficiency to be achieved with respect to the prior art automatic picking up stations.

Another aim of this invention is to provide a method for automatically picking up articles, which allows an improved efficiency to be achieved with respect to the methods for the automatic picking up of articles which can be performed using the prior art automatic picking up stations.

According to a first aspect, this invention relates to an automatic station for picking up articles.

The station comprises a movement system. The movement system comprises a conveyor. The conveyor defines a surface of movement. The movement system is configured for causing a translation of the conveyor. The conveyor is configured to cause, by its translation, at least one translation of a plurality of articles operatively supported by the conveyor, along a first region and subsequently along a second region of the movement surface.

The station comprises a pick-up unit. The pick-up unit is configured to pick up, from the first region and from the second region, the articles operatively supported by the conveyor.

The station comprises a stop unit. The stop unit configured to cause the stopping in the second region of at least one article of the articles operatively supported by the conveyor.

The station comprises a control system. The control system comprises a positioning sensor unit. The positioning sensor unit is configured to perform at least one detection of the positioning relative to the conveyor of the articles operatively supported by the conveyor.

The control system is configured to perform at least a first control of the pick-up unit. The control system is configured so that the first control occurs as a function at least of the detection, in such a way that the pick-up unit picks up from the first region at least a part of the articles operatively supported by the conveyor.

The control system is configured for performing at least one derivation of a movement of the conveyor due to the translation of the conveyor.

The control system is configured so that the first control occurs as a function also of at least the movement, in such a way that the pick-up unit picks up from the first region at least a part of the articles operatively supported by the conveyor.

The control system is configured for performing at least one derivation of the presence of the at least one article in the second region.

The control system is configured to perform at least one control of the stop unit. The control system is configured so that the control of the stop unit occurs as a function of the derivation of the presence, in such a way that the stop unit causes the stopping.

The control system is configured to perform at least one second control of the pick-up unit. The control system is configured so that the second control occurs as a function of the stopping, in such a way that the pick-up unit picks up the at least one article from the second region.

The control system may be configured to perform at least one detection of the articles picked up from the first region.

The control system may be configured so that the derivation of the presence is performed as a function of the detection of the positioning, of the detection of the articles picked up and of the derivation of the movement.

The station may comprise a presence sensor unit. The presence sensor unit, if present, is configured to perform at least one detection of the presence.

The control system may be configured to perform the derivation of the presence by the detection of the presence.

The stop unit may comprise at least one stop element movable between a non-operating position and an operating position. The stop unit may be configured so that the stop element, in the non-operating position, does not cause the stopping of the at least one article and, in the operational position, causes the stopping of the at least one article.

The stop unit may be configured to perform at least one detection of the stopping. The control system may be configured so that the second control occurs as a function of the detection of the stopping.

A second aspect of this invention relates to a method for automatically picking up articles.

The method comprises the translation of the conveyor and the articles. The method comprises the detection of the positioning the articles. The method comprises the first control of the pick-up unit. The method comprises the derivation of the presence. The method comprises the stopping of the at least one article. The method comprises the second control of the pick-up unit.

The features of an automatic pick-up station in accordance with the first aspect of this invention and of a method for automatic picking up in accordance with the second aspect of this invention are described in detail below relative to the respective embodiments of the automatic pick-up stations in accordance with the first aspect and method for automatic picking up in accordance with the second aspect, given by way of non-limiting examples of the concepts claimed.

BRIEF DESCRIPTION OF THE DRAWINGS

The following detailed description refers to the accompanying drawings, in which.

DESCRIPTION OF THE PREFERRED EMBODIMENTS

FIGS. 1 to 4 refer to a diagram partly in blocks of a first possible embodiment of an automatic pick-up station according to the first aspect of this description.

FIGS. 5 to 8 refer to a diagram partly in blocks of a second possible embodiment of an automatic pick-up station according to the first aspect of this description.

An automatic pick-up station according to the first aspect of the invention can be used, for example, in an automatic machine for packaging and/or boxing these articles.

An automatic pick-up station according to the first aspect of the invention can however be used in an automatic machine for other purposes.

The first embodiment of the pick-up station is labelled 1.
The second embodiment of the pick-up station is labelled 1'.

Each of the following features, even if described with reference to the first embodiment labelled 1, is also applicable to the second embodiment labelled 1', unless specified otherwise.

The machine 1 comprises a movement system. The movement system comprises a conveyor 2.

The conveyor 2 defines a movement surface 21. The conveyor 2 is configured to support a plurality of articles, labelled A. The articles A may be, for example, ice cream cones, but may be articles of any another type.

The articles A may be considered as products.

The movement system is configured to cause at least a translation of the conveyor 2 along the movement surface 21, in such a way that the conveyor 2 causes in turn a corresponding translation of the articles A, whilst they are supported by the conveyor 2.

Figure 1:
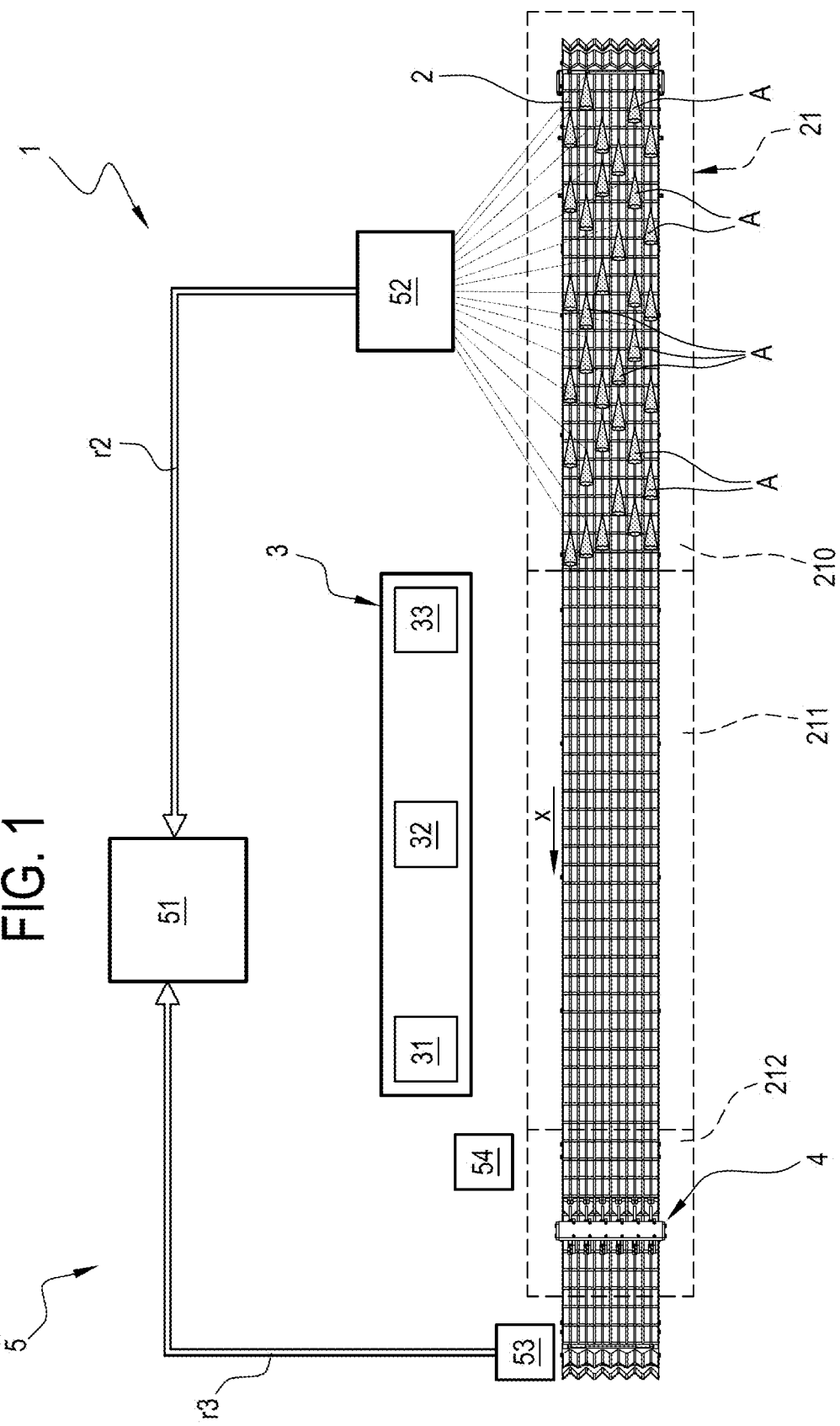
FIG. 1 is a diagram partly in blocks of a first possible embodiment of a pick-up station up according to the first aspect of the invention, in a first instant of a possible process of use of the first embodiment.
Figure 5:
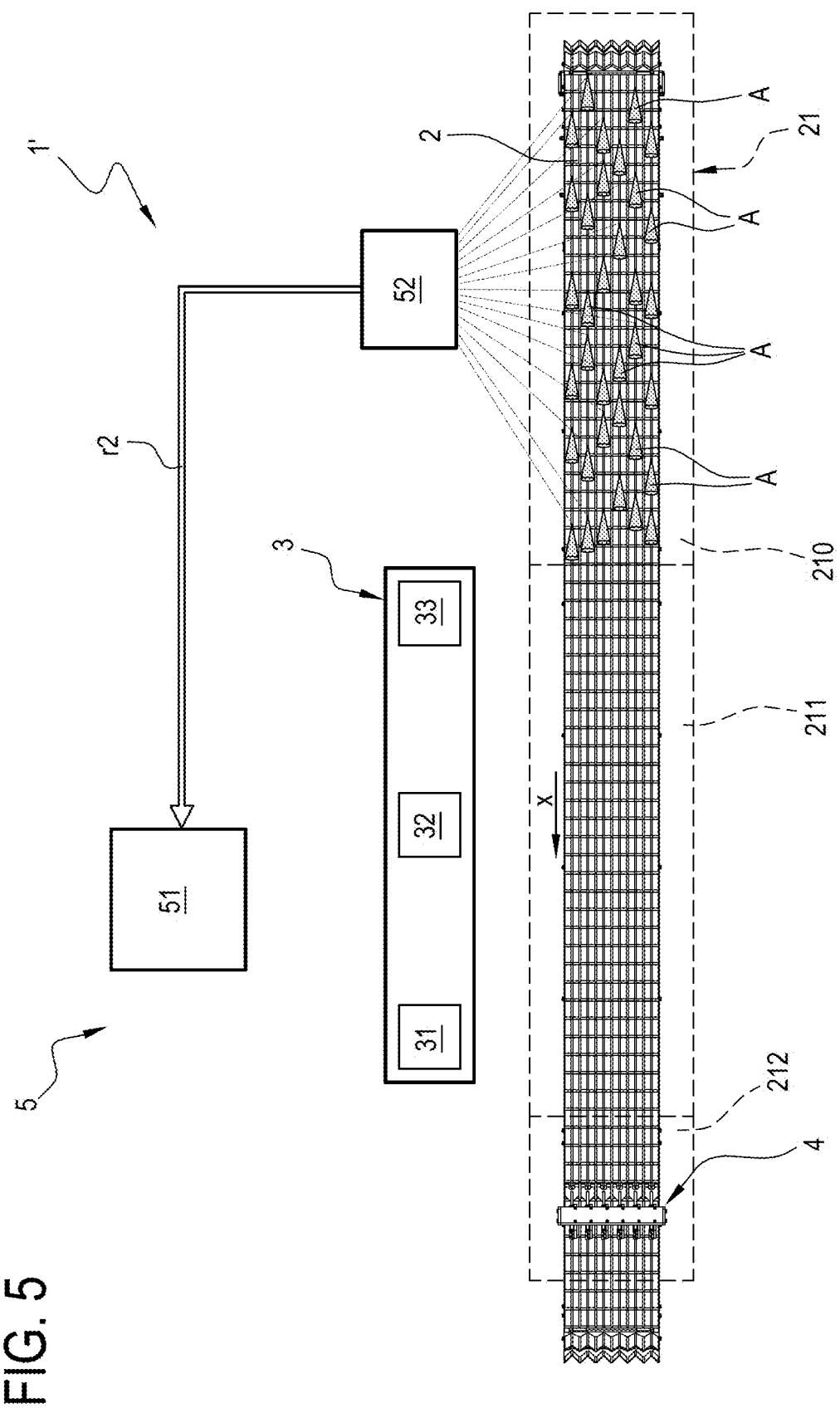
FIG. 5 is a diagram partly in blocks of a second possible embodiment of a pick-up station up according to the first aspect of the invention, in a first instant of a possible process of use of the second embodiment.

The translation may be performed according to the arrow X of FIGS. 1 and 5.

In all the instants to which the accompanying drawings refer the conveyor 2 is subjected to the translation.

So as to cause the translation of the conveyor 2, the movement system preferably comprises at least one motor.

The articles A, whilst they are supported by the conveyor 2 and are subjected to the translation, may be considered as articles A operatively supported by the conveyor 2.

The movement surface 21 comprises at least a first region 211 of the movement surface 21, and at least a second region 212 of the movement surface 21.

The above-mentioned translation of the articles A operatively supported by the conveyor 2 is to be considered along the first region 211 and then along the second region 212.

The second region 212 is situated, according to this translation, after and/or downstream of the first region 211.

The movement surface 21 preferably comprises also at least one inlet region 210 of the movement surface 21.

The above-mentioned translation, if the movement surface 21 comprises the inlet region 210, is to be considered along the inlet region 210, then along the first region 211, and then along the second region 212.

The inlet region 210 is situated, according to this translation, before and/or upstream of the first region 211.

The machine 1 comprises a pick-up unit 3. The pick-up unit 3 is configured for picking up from the conveyor 2 one or more of the articles A operatively supported by the conveyor 2.

The pick-up unit 3 is configured for picking up from the conveyor 2 of one or more of the articles A operatively supported by the conveyor 2, at least when the one or more articles A operatively supported by the conveyor 2 are in the first region 211 of the movement surface 21 and/or when the one or more articles A operatively supported by the conveyor 2 are in this second region 212 of the movement surface 21.

The pick-up unit 3 is configured to pick up, from the first region 211 and from the second region 212, the articles A operatively supported by the conveyor 2.

The pick-up unit 3 may comprise one or more robot units.

The pick-up unit 3 is indicated in the drawings by the block labelled 3.

In the embodiments shown, the pick-up unit 3 comprises by way of example three robot units, labelled, respectively, 31, 32 and 33. The number of robot might however be any number.

A possible method for automatically picking up articles according to the second aspect of this invention comprises the above-mentioned translation of the conveyor 2 and the articles A operatively supported by the conveyor 2. A picking up method described below according to the second aspect of this invention is called simply "method".

Figure 4:
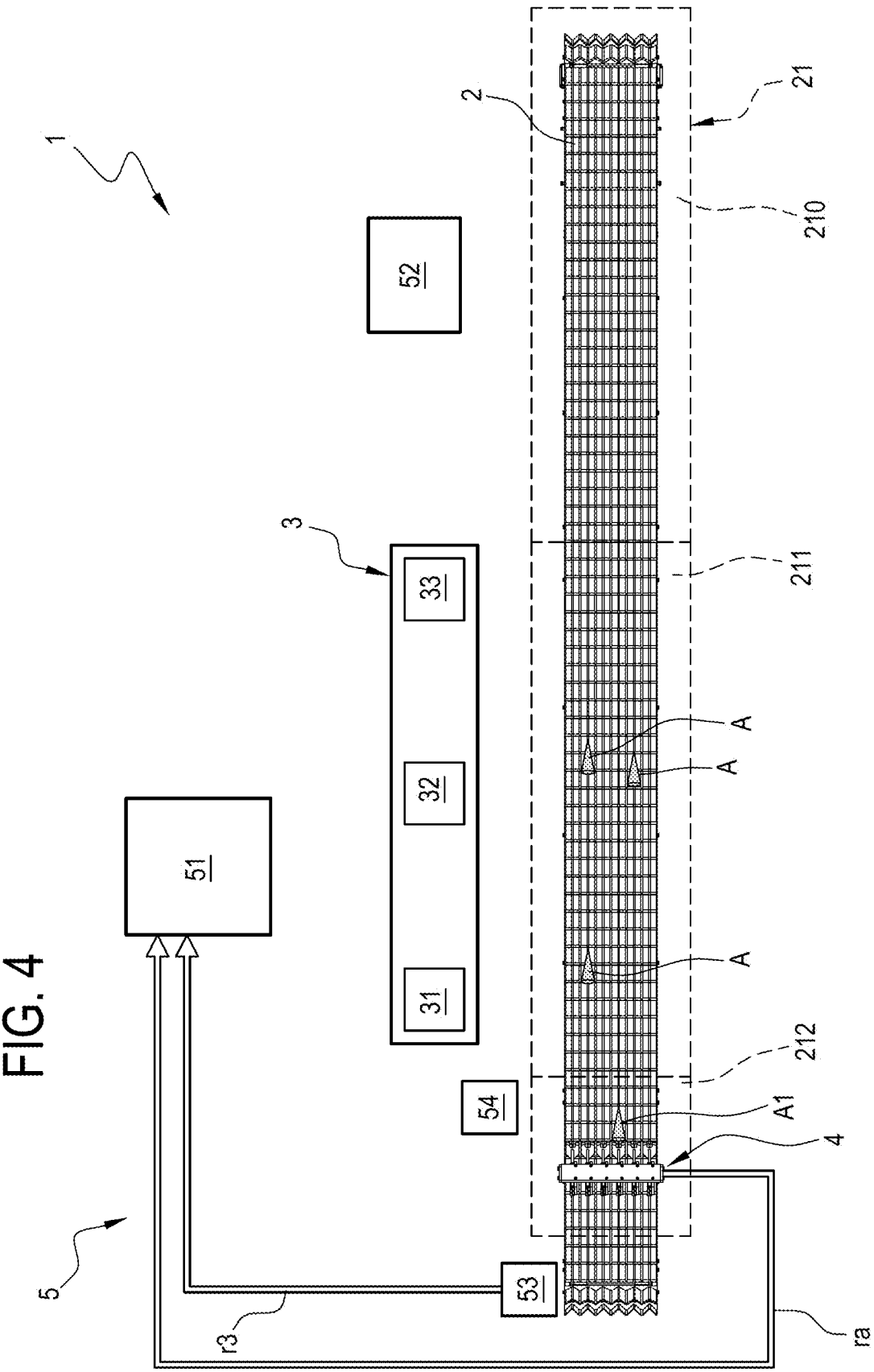
FIG. 4 is a diagram partly in blocks of the first embodiment in a fourth instant of this process of use.
Figure 8:
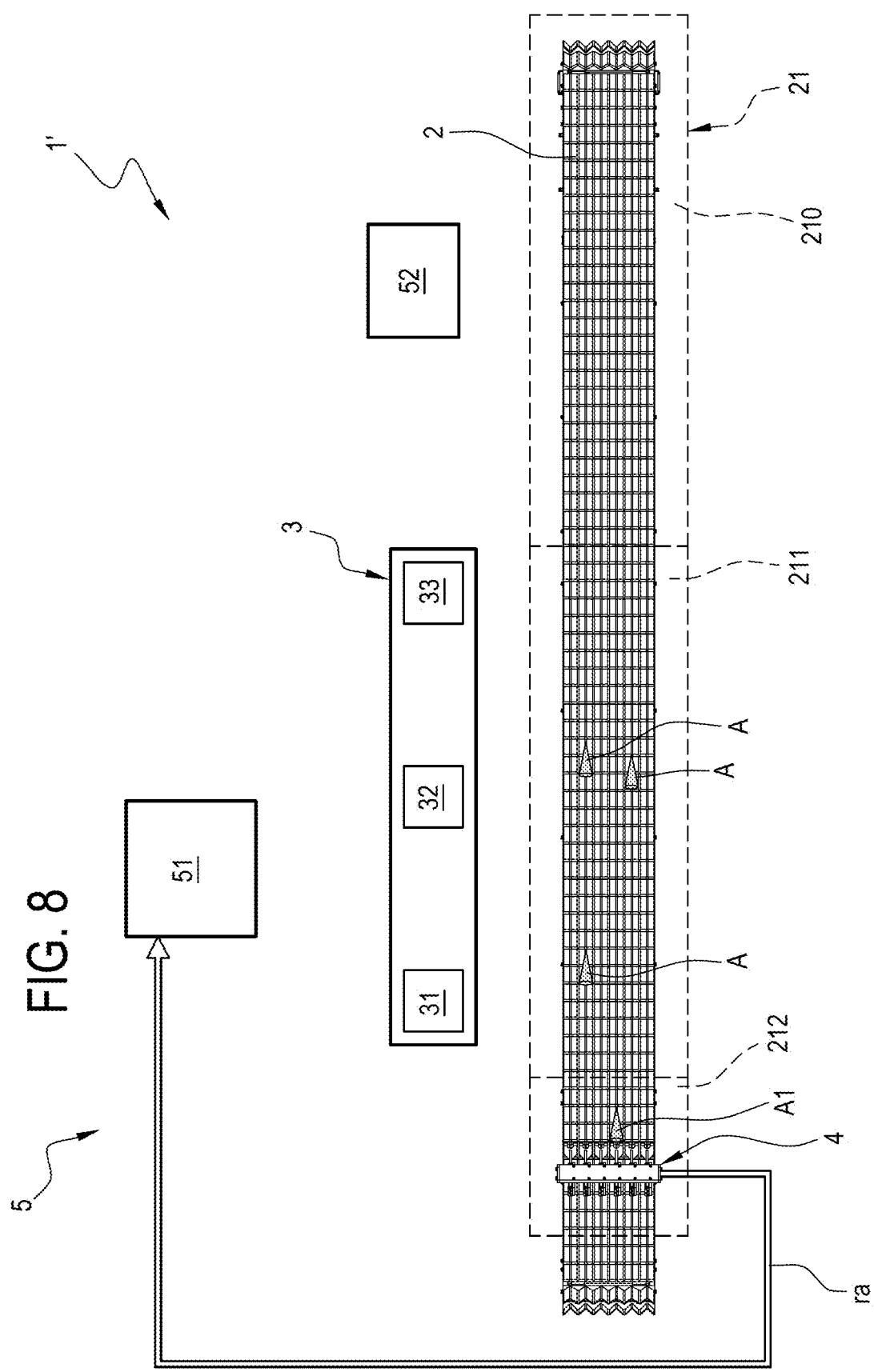
FIG. 8 is a diagram partly in blocks of the second embodiment in a fourth instant of this process of use of the second embodiment.

The machine 1 comprises a stop unit 4. The stop unit 4 configured to cause a stopping of at least one article A1 of the articles A operatively supported by the conveyor 2. The stop unit 4 is configured to cause the stopping when the at least one article A1 is in the second region 212 of the movement surface 21, for example as shown in FIGS. 4 and 8.

The stop unit 4 may comprise at least one stop sensor configured to perform at least one detection of the stopping of the at least one article A1 in the second region 212.

The machine 1 comprises a control system 5.

The control system 5 comprises at least one control unit 51, which may include, for example, at least one processing unit which operates according to a program or software.

The stop sensor can be considered as belonging to the control system 5.

The control system 5 is configured to allow the exchange, between the stop unit 4 and control unit 51, of one or more signals representing the stopping. The one or more signals representing this stopping are indicated by way of example with the arrow "ra" in FIGS. 4 and 8. In FIG. 4 and in FIG. 8 the at least one article A1 is stopped by the stop unit 4.

The control system 5 comprises at least one positioning sensor unit 52.

The positioning sensor unit 52 is configured to perform at least one detection of the positioning of the articles A operatively supported by the conveyor 2.

The method comprises the detection of the positioning.

This positioning is a positioning of each of the articles A operatively supported by the conveyor 2, relative to a reference system which is integral at least with the above-mentioned translation of the conveyor 2. This positioning can therefore be understood as a positioning relative to the conveyor 2.

The positioning sensor unit 52 is configured to perform the detection of the positioning in an instant which may be defined, for convenience, as "initial instant".

In this initial instant the conveyor 2 is located in a position which may be defined, for convenience, as the "initial position" of the conveyor 2.

In this initial instant the articles A may be positioned on the conveyor 2 according to any distribution, which may be totally in a loose fashion or at least partly ordered. The articles A might be positioned, for example, on two or more rows.

In this initial instant the articles A operatively supported by the conveyor 2 are preferably in the above-mentioned inlet region 210 of the movement surface 21. Therefore, the initial position of the conveyor 2 is to be considered preferably a position such that the articles A operatively supported by the conveyor 2 are located in the inlet region 210 of the movement surface 21.

The control system 5 is configured to allow the exchange, between positioning sensor unit 52 and control unit 51, of one or more signals representing this positioning. The one or more signals representing this positioning are indicated by way of example with the arrow "r2" in FIGS. 1 and 5.

FIG. 1 and FIG. 5 show the initial instant wherein the positioning sensor unit 52 is performing the detection of this positioning whilst the articles A operatively supported by the conveyor 2 are in the inlet region 210.

The control system 5 might comprise a movement sensor unit 53. The movement sensor unit 53, if present, is configured to perform, in any respective instant, at least one detection of at least one physical quantity correlated with a movement of the conveyor 2. This movement is to be considered as a movement of the conveyor 2 relative to the above-mentioned initial position and caused by the above-mentioned translation of the conveyor 2 until the respective instant.

The movement sensor unit 53 may comprise an image detector or a sensor of another type, for example an encoder.

The control system 5 is configured to allow the exchange, between the movement sensor unit 53 and the control unit 51, of one or more signals representing the at least one physical quantity. These one or more signals representing the at least one physical quantity is indicated by way of example with the arrow "r3" in FIGS. 1 to 4.

In the first embodiment there is the movement sensor unit 53, whilst in the second embodiment there is not present the movement sensor unit 53.

The control system 5 may comprise a presence sensor unit 54. The presence sensor unit 54, if present, is configured to perform at least a detection of a presence, in the second region 212, of at least one article A1 of the articles A operatively supported by the conveyor 2.

The presence sensor unit 54 may comprise an image detector or a sensor for another type, for example, a contact sensor.

The control system 5 is configured to allow the exchange, between the presence sensor unit 54 and the control unit 51, of one or more signals representing the presence of the at least one article A1 in this second region 212. The one or more signals representing the presence are indicated by way of example with the arrow "r4" in FIG. 3.

In the first embodiment there is the presence unit 54, whilst in the second embodiment there is not the presence sensor unit 54.

Figure 3:
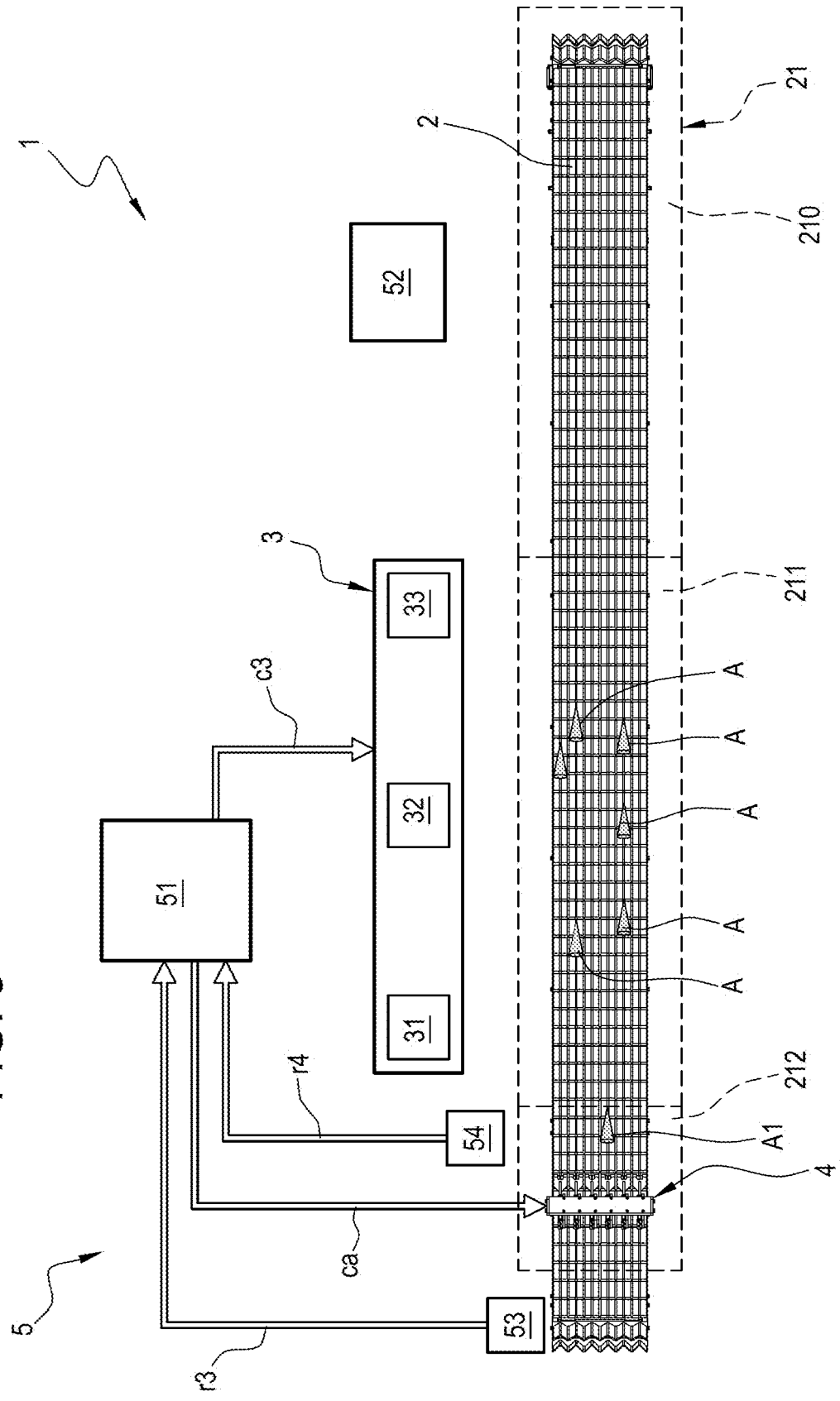
FIG. 3 is a diagram partly in blocks of the first embodiment in a third instant of this process of use.
Figure 7:
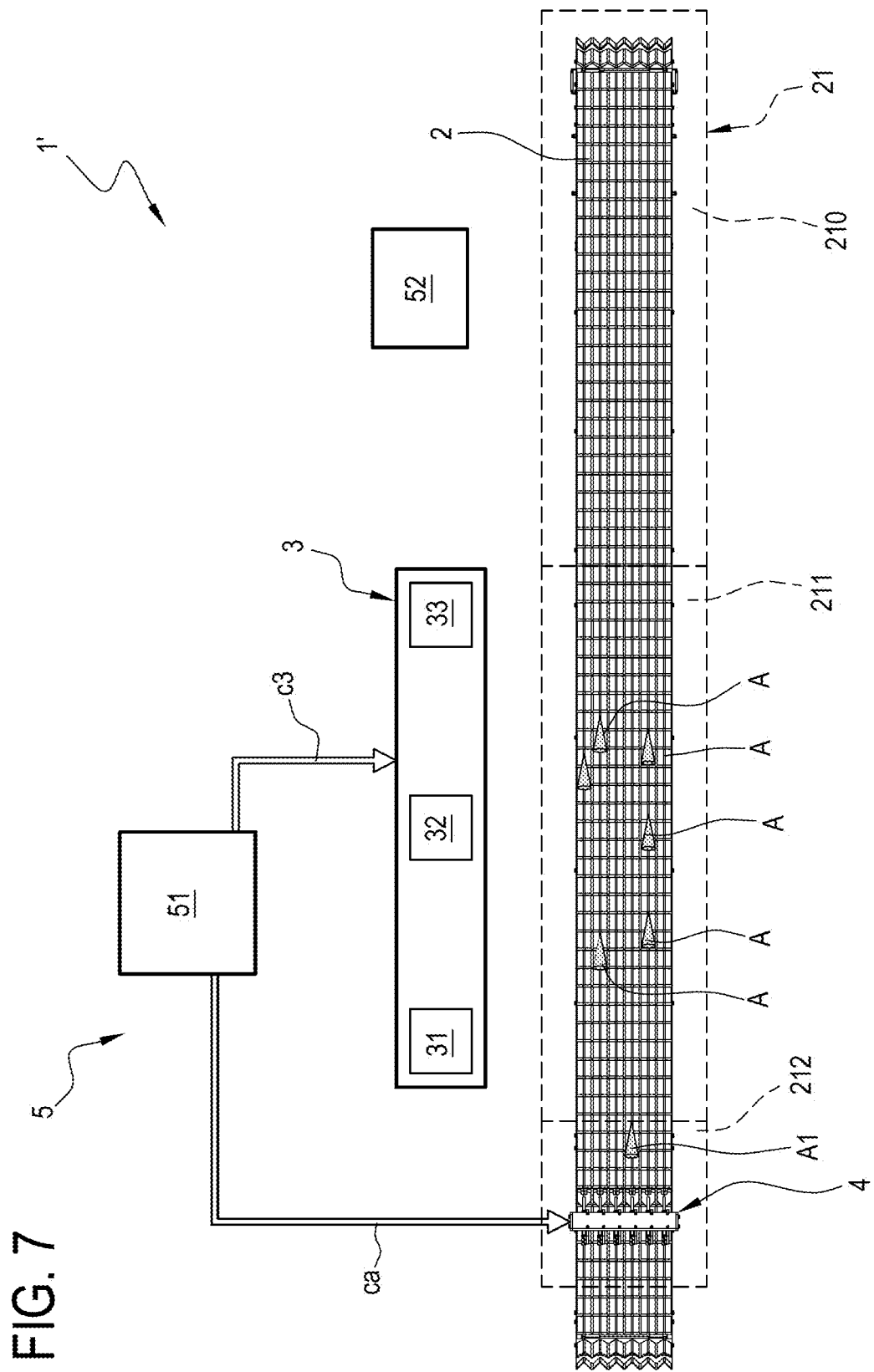
FIG. 7 is a diagram partly in blocks of the second embodiment in a third instant of this process of use of the second embodiment.

In FIGS. 3 and 7 at least one article A1 is in the second region 212.

The control system 5 is configured to perform at least one detection of the picking up, from the first region 211 of the movement surface 21, of the articles A operatively supported by the conveyor 2, in such a way as to detect which of the articles A are picked up from the first region 211 of the movement surface 21.

The control system 5 is configured to perform at least one first control of the pick-up unit 3.

The first control can be performed in such a way that the pick-up unit 3 picks up from the first region 211 at least a part of the articles A operatively supported by the conveyor 2.

The control system 5 is configured so that the first control is performed as a function at least of the detection of the positioning the articles A relative to the conveyor 2.

The control system 5 is configured to perform, at any respective instant, at least one derivation of the above-mentioned movement of the conveyor 2 relative to the above-mentioned initial position and caused by the translation of the conveyor 2 until the respective instant.

The derivation of this movement means obtaining at least one data representing the movement.

The control system 5 is preferably configured so that the first control is performed as a function at least of the detection of the positioning and of the derivation of the movement.

If the movement sensor unit 53 is present configured to perform the detection of the at least one physical quantity correlated with this movement, the control system 5 may be configured so that the derivation of the movement is performed by the detection of the at least one physical quantity.

If the movement sensor unit 53 is present configured to perform the detection of the at least one physical quantity, the control system 5 may be configured so that the first control is a function of the detection of the positioning and of the at least one physical quantity.

The control system 5 may be in any case be configured to perform the derivation of the movement starting from the interval of time passed from the initial instant and from the at least one parameter stored in the control system 5 (for example in the control unit 51). This parameter stored may be, for example, at least one speed of the above-mentioned translation of the conveyor 2.

In FIGS. 5-8, which refer to the second embodiment in which the movement sensor unit 53 is not present, the arrow r3 is not indicated, since the control unit 51 of the control system 5 derives the movement without any detection performed by the movement unit 53, which, as mentioned above, is absent in the second embodiment.

It is to be considered, however, that also the presence of the movement sensor unit 53 does not require necessarily that the control system 5 derives the movement by means of the same movement sensor unit 53.

The method comprises the first control.

Figure 2:
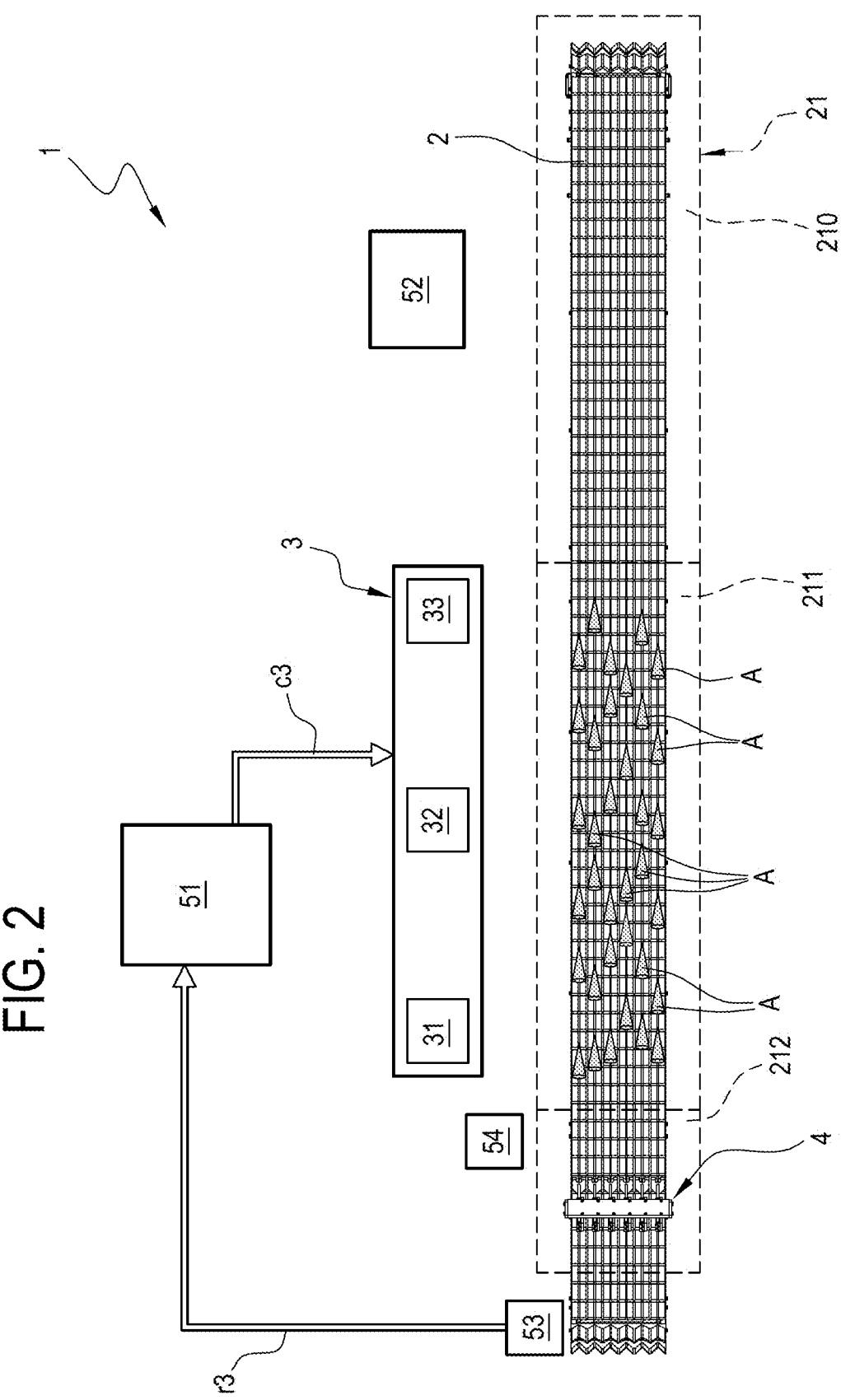
FIG. 2 is a diagram partly in blocks of the first embodiment in a second instant of this process of use.
Figure 6:
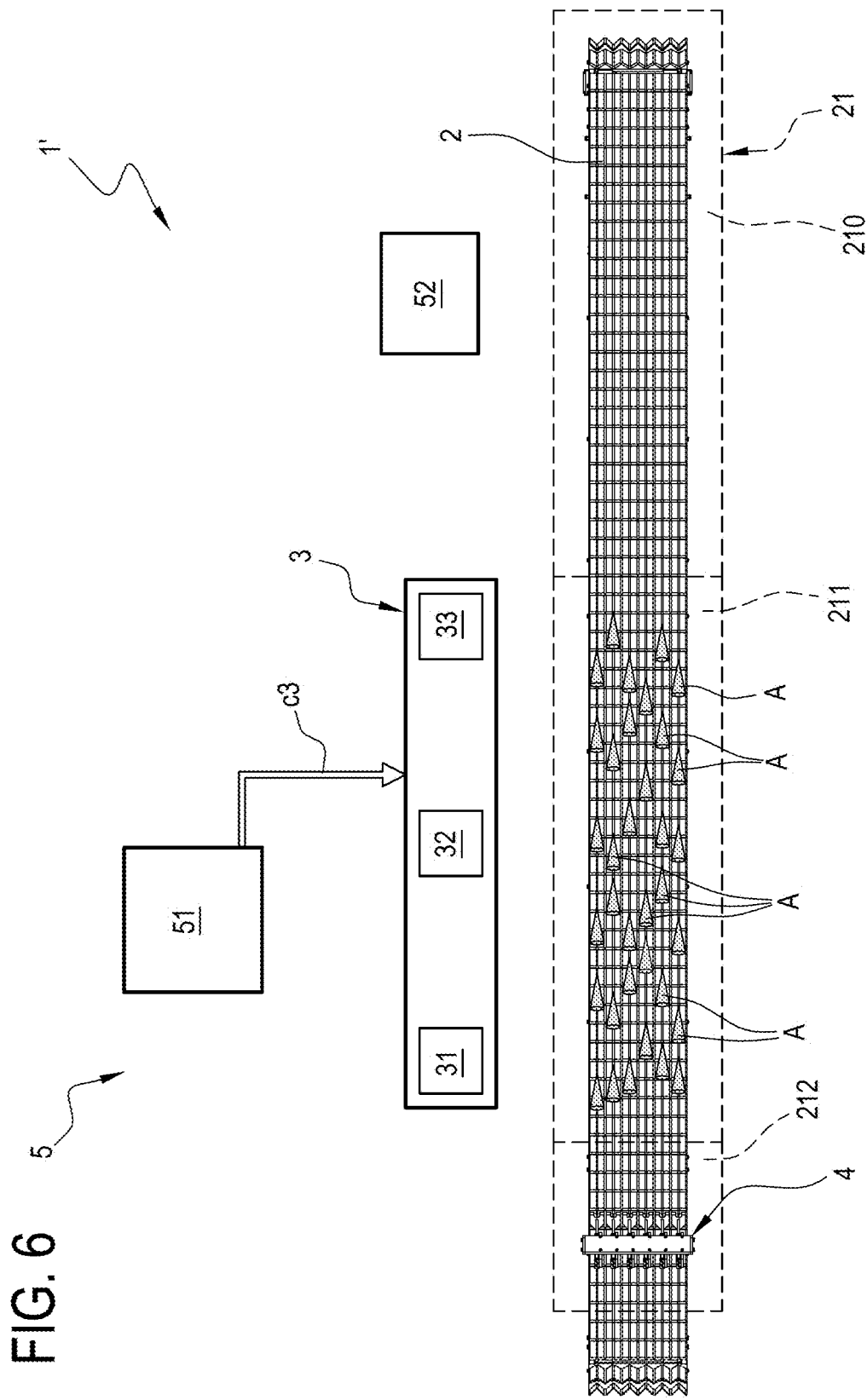
FIG. 6 is a diagram partly in blocks of the second embodiment in a second instant of this process of use of the second embodiment.

In FIG. 2 or in FIG. 6, the articles A which, in FIG. 1 and in FIG. 5, respectively, are in the inlet region 210 of movement surface 21, are now in the first region 211 of the movement surface 21.

Between FIG. 2 and FIG. 3, or between FIG. 6 and FIG. 7, the at least a part of the articles A operatively supported by the conveyor 2 is picked up by means of the pick-up unit 3. In FIG. 3 or in FIG. 7, in effect, at least some of the articles A which are, at least respectively in FIG. 2 and in FIG. 6, in the first region 211, have been picked up by the pick-up unit 3.

The control system 5 is configured to perform at least one derivation of the presence, in the second region 212 of the movement surface 21, of the at least one article A1. The derivation of this presence means obtaining at least one data representing the presence.

The at least one article A1, in FIGS. 3 and 7, is in the second region 212 of the movement surface 21.

If the presence sensor unit 54 is present configured to perform the detection of the presence, the control system 5 can be configured so that the derivation of the presence is performed by the detection of the presence.

The control system 5 may, however, be configured so that the derivation of the presence is performed as a function at least of the detection of the positioning, of the derivation of the movement, and of the detection of the articles picked up from the first region 211.

The control unit 51, in effect, by knowing the initial position of the conveyor 2 in the initial instant, the positioning of the articles A relative to the conveyor 2 and in the initial instant, which articles have been picked up from the first region 211, and the movement of the conveyor 2 relative to the initial position and in any other instant, can derive whether in the any other instant at least one of the articles A is in the second region 212.

In FIG. 7, which refers to the second embodiment in which the presence sensor unit 54 is not present, the arrow r4 is not indicated, since the control unit 51 of the control system 5 derives the presence without any detection performed by the presence sensor unit 54, which, as mentioned above, is absent in the second embodiment.

It is to be considered, however, that also the presence of the presence sensor unit 54 does not require necessarily that the control system 5 derives the presence by means of the same presence sensor unit 54.

In the case in which:

the control system 5 is configured so that the derivation of the presence is performed as a function at least of the detection of the positioning, of the derivation of the movement, and of the detection of the articles picked up from the first region 211;

the control system 5 is configured so that the derivation of the movement is performed by the detection of the at least one physical quantity by the movement sensor unit 53;

then the control system 5 is configured so that the derivation of the presence is performed as a function at least of the detection of the positioning, the derivation of the at least one physical quantity, and of the detection of the articles picked up from the first region 211.

The control system 5 is configured to perform at least one control of the stop unit 4. The control of the stop unit 4 is performed in such a way that the stop unit causes at least one stopping the at least one article A1 in the second region 212.

The control system 5 is configured so that the control of the stop unit 4 is performed as a function at least of the derivation of the presence.

If the presence sensor unit 54 is present configured to perform the detection of the presence, the control system 5 may be configured so that the control of the stop unit 4 is a function at least of the detection of the presence.

If the control system 5 is configured so that the derivation of the presence is performed as a function at least of the detection of the positioning, the derivation of the movement, and the detection of the articles picked up from the first region 211, it follows that the control system 5 is configured so that the control of the stop unit 4 is a function at least of the detection of the positioning, the derivation of the movement, and the detection of the articles picked up from the first region 211.

In the case in which:

the control system 5 is configured so that the derivation of the presence is performed as a function at least of the detection of the positioning, of the derivation of the movement, and of the detection of the articles picked up from the first region 211; and the control system 5 is configured so that the derivation of the movement is performed by the detection of the at least one physical quantity by the movement sensor unit 53;

then the control system 5 is configured so that the control of the stop unit 4 is performed as a function at least of the detection of the positioning, the detection of the at least one physical quantity, and of the detection of the articles picked up from the first region 211.

The control system 5 is configured to allow the exchange, between the control unit 51 and the stop unit 4, of one or more control and/or command signals of the stop unit 4, so that the control system 5 can perform the control of the stop unit 4. The one or more control and/or command signals of the stop unit 4 are indicated by way of example with the arrow "ca" in FIGS. 3 and 7.

In FIGS. 4 and 8, the at least one article A1 is in a stop condition caused by the stop unit 4.

The method comprises the stopping.

The control system 5 is configured to perform at least one second control of the pick-up unit 3. The second control can be performed in such a way that the pick-up unit 3 picks up from the second region 212 the at least one article A1.

The control system 5 is preferably configured so that the second control occurs after the stop and/or as a function at least of the stopping the at least one article A1.

The control system 5 is preferably configured so that the second control occurs as a function of at least the above-mentioned detection of the stop of the at least one article A1, performed by the at least one stop sensor which belongs to the stop unit 4 (but which may be considered as also belonging to the control system 5).

The second control step is performed after the operating situation shown in FIG. 4, as regards the first embodiment, and after the operating situation shown in FIG. 8, as regards the second embodiment.

The control system 5 is configured to allow the exchange, between the control unit 51 and the pick-up unit 3, of one or more control and/or command signals of the pick-up unit 3, so that the control system 5 can perform the first control and/or the second control. The one or more control and/or command signals of the pick-up unit 3 are indicated by way of example with the arrow "c3" in FIGS. 2, 3, 6, and 7.

The method comprises the second control.

One or more of the derivations performed by the control system 5, one or more of the detections performed by the control system 5, and one or more of the controls performed by the control system 5, described above, are preferably performed automatically.

The control of the stop unit 4 might also be done manually by an operator.

Preferably, all the derivations, checks and detections performed by the control system 5 are performed automatically.

Further embodiments might comprise the movement sensor unit 53, but not the presence sensor unit 54, or it might comprise the presence sensor unit 54, but not the movement sensor unit 53.

Figure 9:
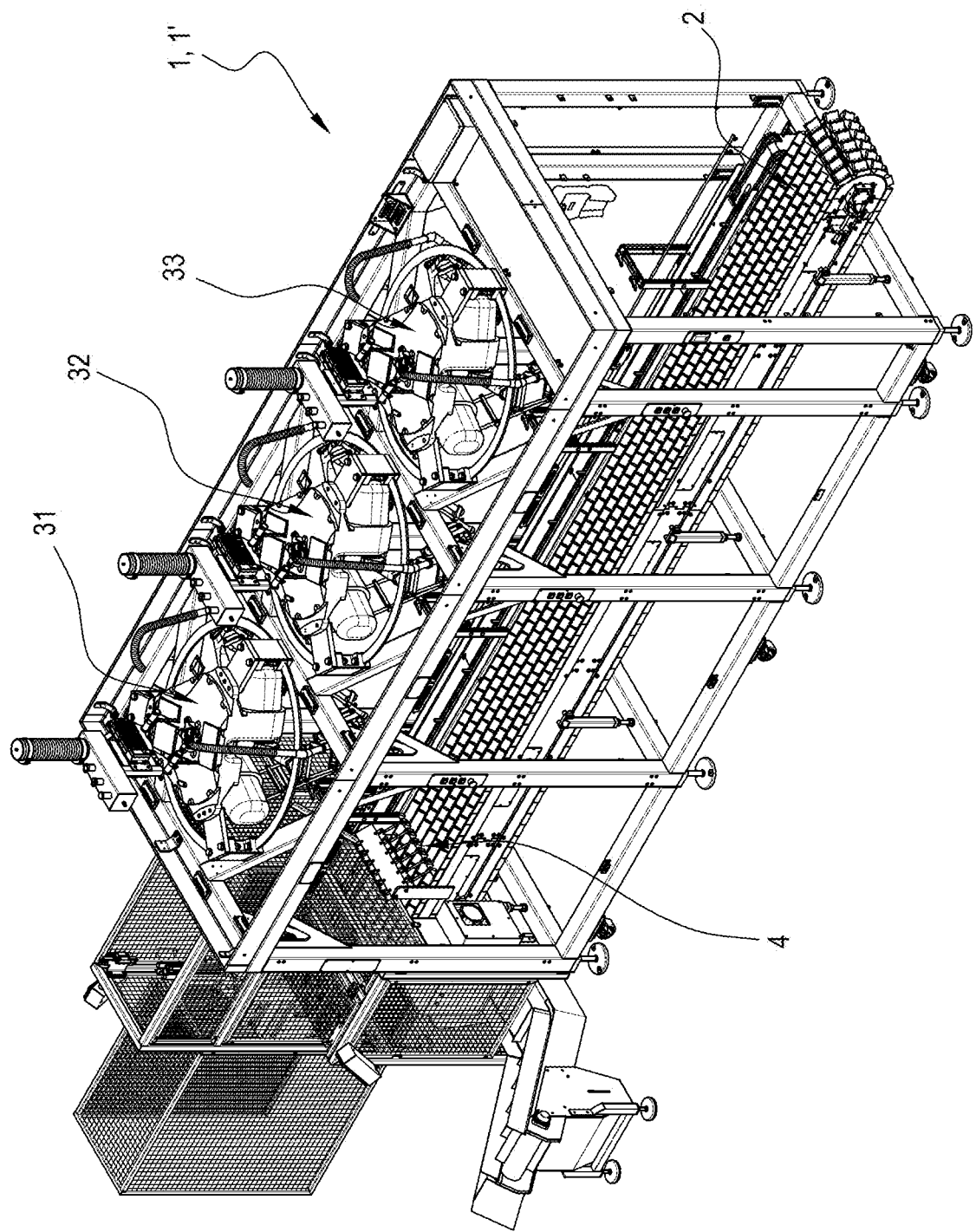
FIGS. 9 and 10 illustrate, respectively, in a perspective view and a side view, some components present both in the first embodiment and in the second embodiment of the pick-up station.
Figure 10:
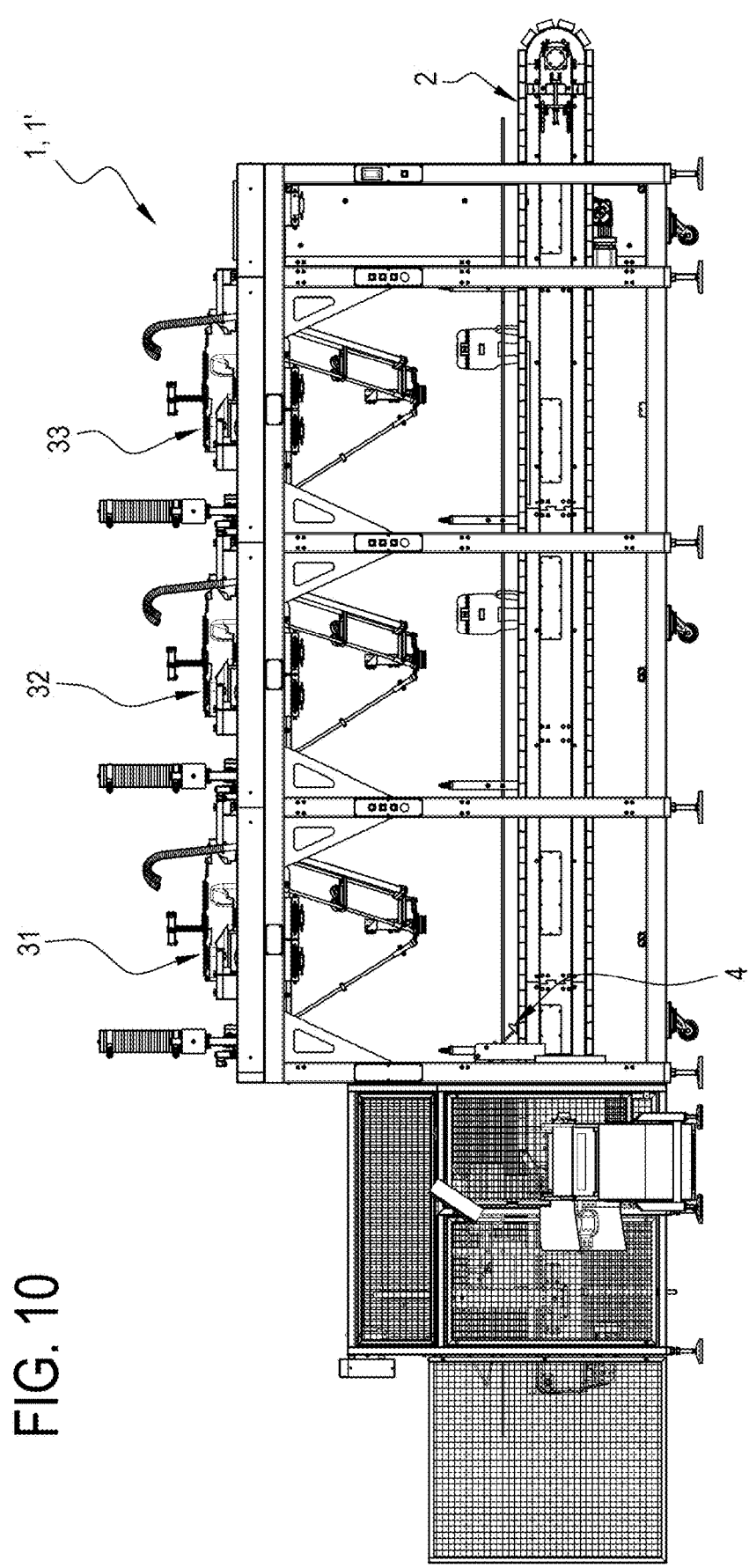

FIGS. 9 and 10 show a pick-up station which, due to the visible features, may be according to the first embodiment or the second embodiment.

FIGS. 9 and 10 show three robot unit 31, 32 or 33, which operate on the conveyor 2 for picking up the articles, which are not shown.

FIGS. 9 and 10 also show the stop unit 4.

The stop unit 4 comprises at least one stop element. The stop unit is configured so that the at least one stop element can adopt an operating position wherein it is designed to cause the stopping of the above-mentioned at least one article A1 in the second region 212 of the movement surface 21, and a non-operating position wherein it is not designed to cause the stopping.

As shown in FIGS. 9 and 10, the stop unit 4 may comprise a plurality of stop elements, each designed to cause at least one respective stopping of at least one respective article in the second region.

According to a further aspect, this invention may relate to a machine for packaging and/or boxing articles or products, preferably for packaging and/or boxing food articles or products.

The machine, which may be directed to other purposes, may comprise at least one pick-up station according to the first aspect of this description.

It should be noted that in FIGS. 2 to 4 and from 6 to 8, in order to simplify the descriptions, no further articles are shown in the inlet region 210 (which, on the other hand, assuming a substantially constant flow of articles at the inlet, would be present in the inlet region 210).

What is claimed is:

1. An automatic station for picking up articles comprising:
    a movement system which comprises a conveyor defining a movement surface, the movement system being configured to cause, by translation of the conveyor, a translation of a plurality of articles operatively supported by the conveyor, along a first region of the movement surface and subsequently along a second region of the movement surface positioned downstream of the first region relative to the translation;
    a pick-up unit comprising one or more robot units and configured to pick up, from the first region and from the second region, the articles operatively supported by the conveyor;
    a stop unit configured to cause stopping in the second region of at least one article of the plurality of articles operatively supported by the conveyor;
    a control system which comprises a positioning sensor unit, the positioning sensor unit being configured to detect positioning, relative to the conveyor, of the plurality of articles operatively supported by the conveyor;
    wherein the control system is configured for:
        controlling the pick-up unit, as a function of the detecting of the position, so that the pick-up unit picks up from the first region at least a part of the plurality of articles operatively supported by the conveyor;
        detecting a presence of the at least one article in the second region;
        controlling the stop unit, as a function of the detecting the presence, so that the stop unit causes the stopping;
        controlling the pick-up unit so that the pick-up unit picks up the at least one article from the second region.

2. The automatic station for picking up articles according to claim 1,
    wherein the control system is configured to detect the at least part of the plurality of articles picked up from the first region and to detect a movement of the conveyor due to the translation of the conveyor,
    the control system being configured to perform the detecting the presence as a function at least of the detecting of the positioning, the detecting of the articles picked up, and the detection of the movement.

3. The automatic station for picking up articles according to claim 1, comprising:
    a presence sensor unit configured to detect the presence of the at least one article in the second region,
    wherein the control system is configured to determine the presence of the at least one article in the second region based on the detecting of the presence of the at least one article in the second region by the presence sensor unit.

4. The automatic station for picking up articles according to claim 1, wherein the stop unit comprises a stop element movable between a non-operating position and an operating position, the stop unit being configured so that the stop element, in the non-operating position, does not cause the stopping of the at least one article and, in the operational position, causes stopping of the at least one article.

5. The automatic station for picking up articles according to claim 1, wherein the stop unit comprises a stop sensor which is configured to perform at least one detection of the stop, the control system being configured so that the picking up of the at least one article from the second region is performed as a function at least of the detection of the stopping.

6. A method for automatically picking up articles, comprising:
    translating a plurality of the articles operatively supported by a conveyor, along a movement surface defined by the conveyor, the conveyor comprising a first region and a second region, the second region being located after the first region;

detecting a positioning relative to the conveyor of the plurality of articles operatively supported by the conveyor, the detecting being performed by a positioning sensor unit which forms part of a control system;

performing, by the control system, a first control of a pick-up unit to pick up a part of the plurality of articles from the first region as a function of at least the detecting of the positioning, the pick-up unit including one or more robots;

detecting a presence in the second region of at least one article of the plurality of articles operatively supported by the conveyor, the detecting being performed by the control system;

stopping, via a stop unit, at least one article in the second region;

performing, by the control system, a second control of the pick-up unit to pick up the at least one article stopped in the second region.

7. The method for automatically picking up articles according to claim 6, comprising:
- detecting the articles picked up from the first region,
- detecting a movement of the conveyor due to the translation of the conveyor;
- wherein the detecting of the presence is performed at least as a function of the detecting of the positioning, the detecting of the articles picked up, and the detecting of the movement.

8. The method for automatically picking up articles according to claim 6, comprising detecting the presence with a presence sensor unit.

9. The method for automatically picking up articles according to claim 6,
wherein the stopping of the at least one article occurs by the passage of at least one stop element, belonging to the stop unit, from a non-operating position where the stop element does not cause the stopping of the at least one article, to an operating position where the stop element causes the stopping of the at least one article.

10. The method for automatically picking up articles according to claim 6, and further comprising:
- detecting the stopping,
- performing the second control as a function at least of the detecting of the stopping.

* * * * *